(12) United States Patent
Schmaling et al.

(10) Patent No.: US 7,585,153 B1
(45) Date of Patent: Sep. 8, 2009

(54) UPPER ROTOR CONTROL SYSTEM FOR A COUNTER-ROTATING ROTOR SYSTEM

(75) Inventors: David N. Schmaling, Southbury, CT (US); Pedro L. Cabrera, West Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 476 days.

(21) Appl. No.: 11/502,668

(22) Filed: Aug. 11, 2006

(51) Int. Cl.
*B64C 27/80* (2006.01)
(52) U.S. Cl. .................... 416/129; 416/130; 416/168 R
(58) Field of Classification Search ................ 416/130, 416/129, 148, 168 R, 164, 167, 150, 102, 416/108
See application file for complete search history.

(56) References Cited

U.S. PATENT DOCUMENTS

| | | | | |
|---|---|---|---|---|
| 4,367,063 A | * | 1/1983 | Herruzo | 416/130 |
| 5,165,854 A | * | 11/1992 | Cicare | 416/168 R |
| 5,826,822 A | * | 10/1998 | Rehm | 416/168 R |
| 2004/0144892 A1 | | 7/2004 | Gerbino | |
| 2006/0102777 A1 | | 5/2006 | Rock | |

OTHER PUBLICATIONS

PCT International Search Report and written opinion mailed Jul. 18, 2008.
PCT written opinion mailed Feb. 10, 2009.

* cited by examiner

*Primary Examiner*—Richard Edgar
(74) *Attorney, Agent, or Firm*—Carlson, Gaskey & Olds PC (57) ABSTRACT

An upper rotor control system is contained within an upper rotor shaft and upper hub assembly of a contra-rotating rigid rotor system. A collective servo assembly includes a hydraulic actuator that provides collective pitch to all blades through axial extension/retraction of the control rod relative the upper rotor shaft for collective pitch control of the rotor blades. The collective servo assembly includes a spherical bearing for attachment of the control rod to aircraft structure. An X-Y positioner assembly includes a bearing arrangement which allows the shaft to rotate, while the X-Y positioner assembly remains non-rotational therein. The X-Y positioner assembly includes a multitude of hydraulic actuators, orthogonally positioned, to tilt the control rod about the spherical bearing off the axis of rotation of the upper rotor shaft for cyclic pitch control of the rotor blades.

17 Claims, 9 Drawing Sheets

FIG.8C

UPPER ROTOR CONTROL SYSTEM FOR A COUNTER-ROTATING ROTOR SYSTEM

BACKGROUND OF THE INVENTION

The present invention relates to a rotor control system for a rotary-wing aircraft, and more particularly to an upper rotor control system for a counter-rotating rotor system.

Control of a rotary-wing aircraft is affected by varying the pitch of the rotor blades individually as the rotor rotates and by varying the pitch of all of the blades together. These are known respectively as cyclic and collective pitch control. Blade pitch control of a rotary wing aircraft main rotor is typically achieved through a swashplate assembly which transfers the motion of non-rotating control members to the rotating members.

The swash plate assembly is typically concentrically mounted about a rotor shaft. The swash plate assembly generally includes two rings connected by a series of bearings with one ring connected to the airframe (stationary), and the other ring connected to the rotor hub (rotating). The rotating ring is connected to the rotor hub through a pivoted link device typically referred to as "scissors", with the static ring similarly connected to the airframe. The rotating swash plate rotates relative the stationary swash plate. Apart from rotary motion, the stationary and rotating swash plate otherwise move as a unitary component.

Collective control is achieved by translating the swash plate assembly up and down with respect to the rotor shaft and cyclic control is achieved by tilting the swash plate relative to the rotor shaft. The stationary ring is typically mounted about the rotor shaft through a spherical ball joint or uniball that allows for tilt of the swash plate assembly, with the standpipe surrounding the rotor shaft allowing translation of the swash plate assembly along the axis. The pitch links connect the rotating ring of the swash plate assembly to the pitch or control arms of the rotor blades. The stationary swash plate assembly of the swash plate assembly is positioned by servos which are actuated in response to the pilot's control signals. Thus, when the pilot inputs a control command, the stationary swash plate assembly is raised, lowered or tilted and the rotating swash plate assembly follows to impact collective and cyclic pitch control to the rotor disc.

A rotary wing aircraft with a counter-rotating rotor system requires an upper and lower rotor control system. Modern flight control systems may also control the upper rotor system independent of the lower control system so as to provide increased fidelity of aircraft control. The lower rotor system typically utilizes a relatively conventional swashplate arrangement mounted about a lower rotor shaft while the upper rotor system utilizes a relatively more complex upper rotor control system mounted through the upper rotor shaft which counter-rotates relative the lower rotor shaft. The upper rotor control system includes an upper rotor swashplate assembly, a motion multiplier, and long control rods, located inside the upper rotor shaft. Buckling stability of the long rods requires a relatively heavy, large diameter solution which may be difficult to package within the rotor shaft.

Accordingly, it is desirable to provide a compact, lightweight upper rotor control system for a counter-rotating rigid rotor system.

SUMMARY OF THE INVENTION

The upper rotor control system for a counter-rotating rotor system according to the present invention generally is contained within an upper rotor shaft of the counter-rotating shafts. The upper rotor control system generally includes a collective servo assembly, a control rod, an X-Y positioner assembly, a duplex bearing control rod linkage, a pitch beam, a pitch beam uniball and a pitch beam hub support.

The collective servo assembly includes a hydraulic actuator that provides collective pitch to all blades through axial movement of the control rod relative the rotor shaft. The collective servo assembly includes a spherical bearing for attachment of the control rod to fixed (non-rotating) aircraft structure about which the control rod tilts.

The X-Y positioner assembly includes a bearing arrangement which allows the shaft to rotate, while the X-Y positioner assembly and control rod remain non-rotational therein. The X-Y positioner assembly includes a multitude of hydraulic actuators, orthogonally positioned adjacent the upper end of the control rod opposite the collective servo assembly to tilt the control rod off the axis of rotation of the upper rotor shaft for cyclic control of the rotor blades.

The duplex bearing control rod linkage includes a uniball linkage attachment between the control rod and a rotational bearing arrangement mounted to the pitch beam such that the pitch beam rotates relative the control rod upon the bearing arrangement while cyclic pitch movement between the pitch beam and the control rod is accommodated by the uniball linkage.

The pitch beam is supported within the hub assembly through the pitch beam uniball upon the pitch beam hub support which projects from an upper hub surface of the hub assembly. The pitch beam uniball slides along the pitch beam hub support during axial movement (collective) of the pitch beam and tilts about the uniball during tilting movement (cyclic). A pitch beam scissor assembly attaches between the pitch beam and the hub assembly to accommodate axial (collective) and tilting (cyclic) motions of the pitch beam.

The present invention therefore provides a compact, lightweight upper rotor control system for a counter-rotating rotor system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
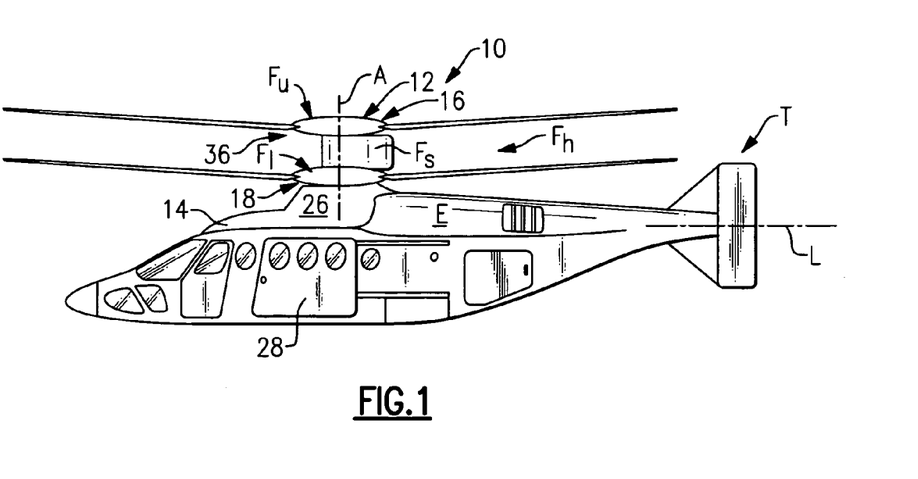
FIG. 1 is a general perspective side view of an exemplary rotary-wing aircraft embodiment for use with the present invention.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems will also benefit from the present invention.

A main gearbox 26 which may be located above the aircraft cabin drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
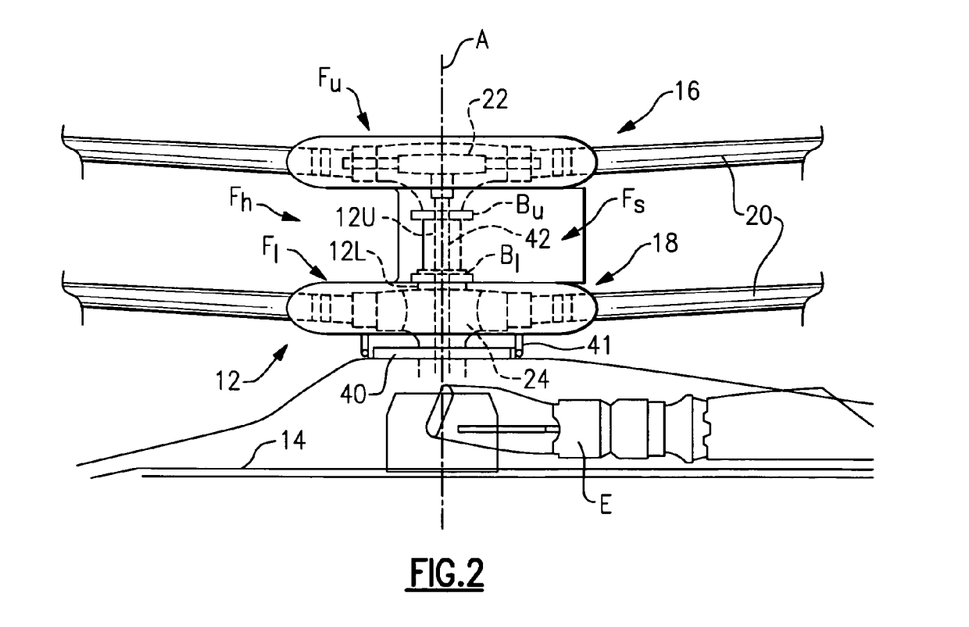
FIG. 2 is an expanded partial phantom view of a dual, counter-rotating, coaxial rotor system of the aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The plurality of the main rotor blade assemblies 20 project substantially radially outward from the hub assemblies 22, 24. Any number of main rotor blade assemblies 20 may be used with the rotor system 12.

The rotor system 12 preferably also includes a rotor hub fairing system Fh generally located between and around the upper and lower rotor systems 16, 18 such that the rotor hub assemblies 22, 24 are at least partially contained therein. The rotor hub fairing system Fh preferably includes an upper hub fairing Fu, a lower hub fairing Fl and a shaft fairing Fs therebetween. The shaft fairing Fs is preferably attached to the counter-rotating, coaxial rotor system 12 through a bearing arrangement Bu, Bl such that the shaft fairing Fs is aligned with the relative wind in forward flight but may alternatively be free to pivot during low speed maneuvering. The upper bearing Bu and the lower bearing Bl are respectively located adjacent an upper portion and a lower portion of the shaft fairing Fs. The upper bearing Bu is preferably attached to one rotor shaft 12U while the lower bearing Bl attached to the other rotor shaft 12L such that the bearings are counter rotating and net bearing drag is relatively low.

Figure 3:
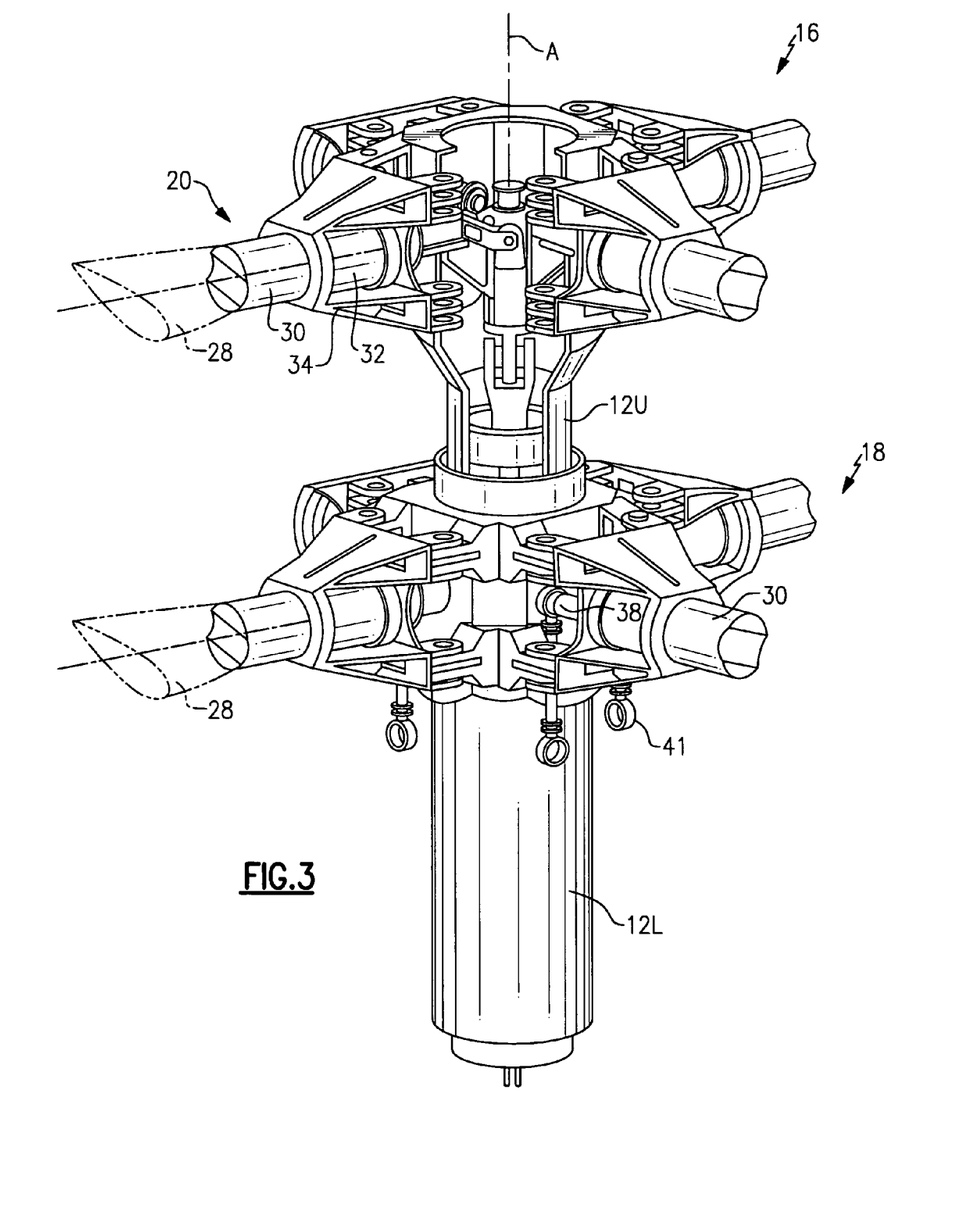
FIG. 3 is a partial fragmentary view of the a dual, counter-rotating, coaxial rotor system.

Referring to FIG. 3, each rotor blade assembly 20 of the rotor system 12 generally includes a rotor blade 28 (illustrated somewhat schematically), a rotor blade spindle 30, and a rotor blade bearing 32 which supports the rotor blade spindle 30 within a bearing housing 34. It should be understood that various blade attachments may also be utilized with the present invention.

A lower rotor control system 36 includes a rotor blade pitch control horn 38 mounted for rotation with the rotor blade spindle 30 of each rotor blade 28. Each rotor blade pitch control horn 38 is linked to a lower swashplate 40 (FIG. 2) through a pitch control rod 41 to impart the desired pitch control thereto. It should be understood that the pitch control rods 41 for the lower rotor system 18 are preferably located external to the main rotor shaft 12L for pitch control of the lower rotor system 18. It should be understood, that various pitch control rods and links at various locations for cyclic and collective pitch control of the lower rotor system 18 may be utilized with the present invention. It should be further understood that control of the lower rotor system 18 may be of conventional design such that it need not be described in particular detail herein.

Figure 4:
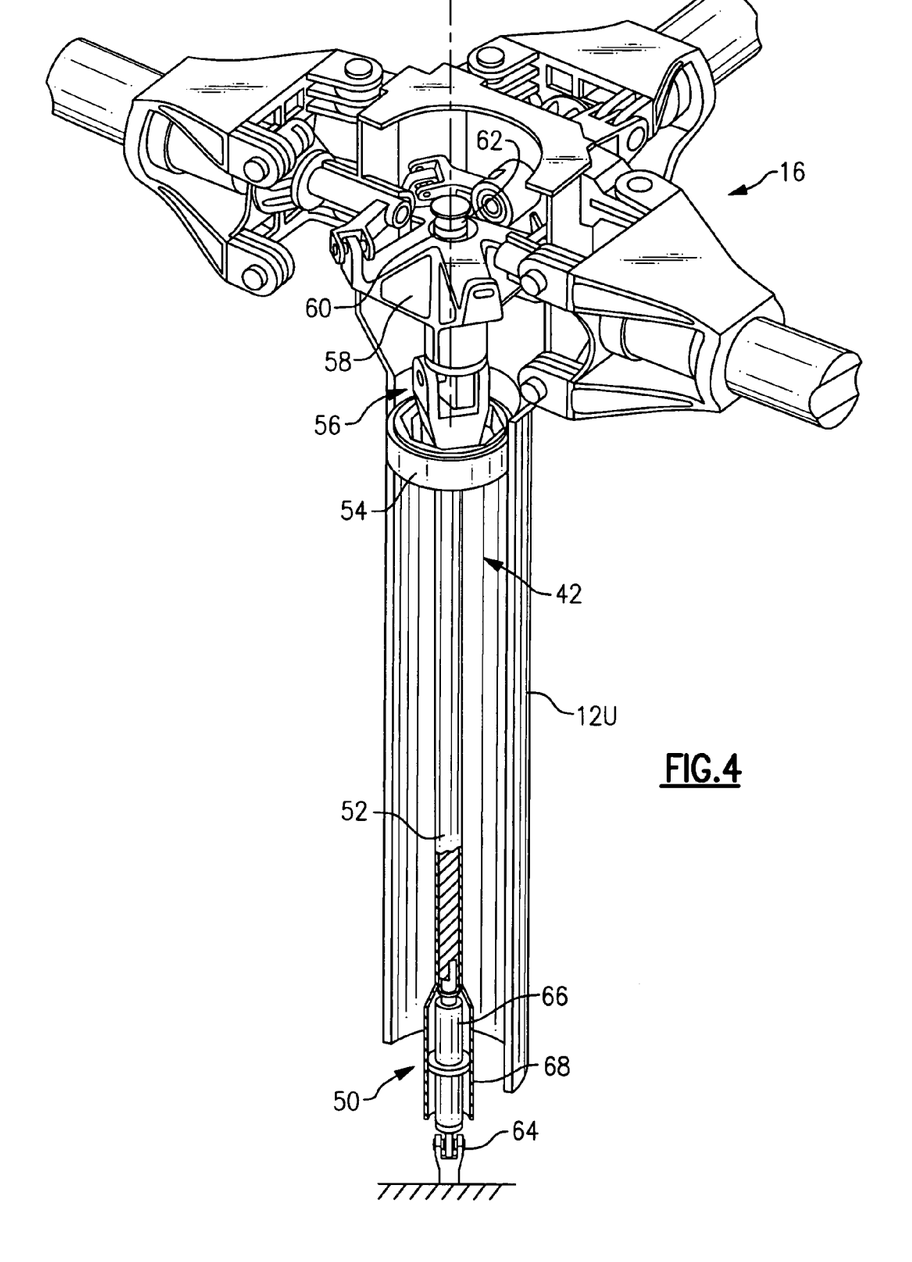
FIG. 4 is a partial fragmentary view of the upper rotor system of the dual, counter-rotating, coaxial rotor system.

Referring to FIG. 4, the upper rotor control system 42 is preferably contained within the upper rotor shaft 12U which counter-rotates relative the lower rotor shaft 12L. The upper rotor control system 42 generally includes a collective servo assembly 50, a control rod 52, an X-Y positioner assembly 54, a duplex bearing control rod linkage 56, a pitch beam 58, a pitch beam uniball 60 and a pitch beam hub support 62. The control tube 52 preferably provides a geometry conducive to manufacture in composites (such as carbon fiber in resin) to minimize component weight.

The collective servo assembly 50 includes a spherical bearing 64 which attaches a collective servo 66 mounted to fixed aircraft structure (illustrated schematically). The spherical bearing 64 defines the point at which the control rod 52 tilts about. It should be understood that other mounting arrangements may likewise be utilized to define this point. The control rod 52 is attached to the collective servo 50 within a control rod sleeve 68 or the like to further support the control rod during axial (collective) movement along axis A. Preferably, the control rod sleeve 68 contains a collective hydraulic cylinder, rigidly attached at its upper end to the control rod 52 to provide an essentially pinned/pinned beam that can vary axially in length.

Figure 5A:
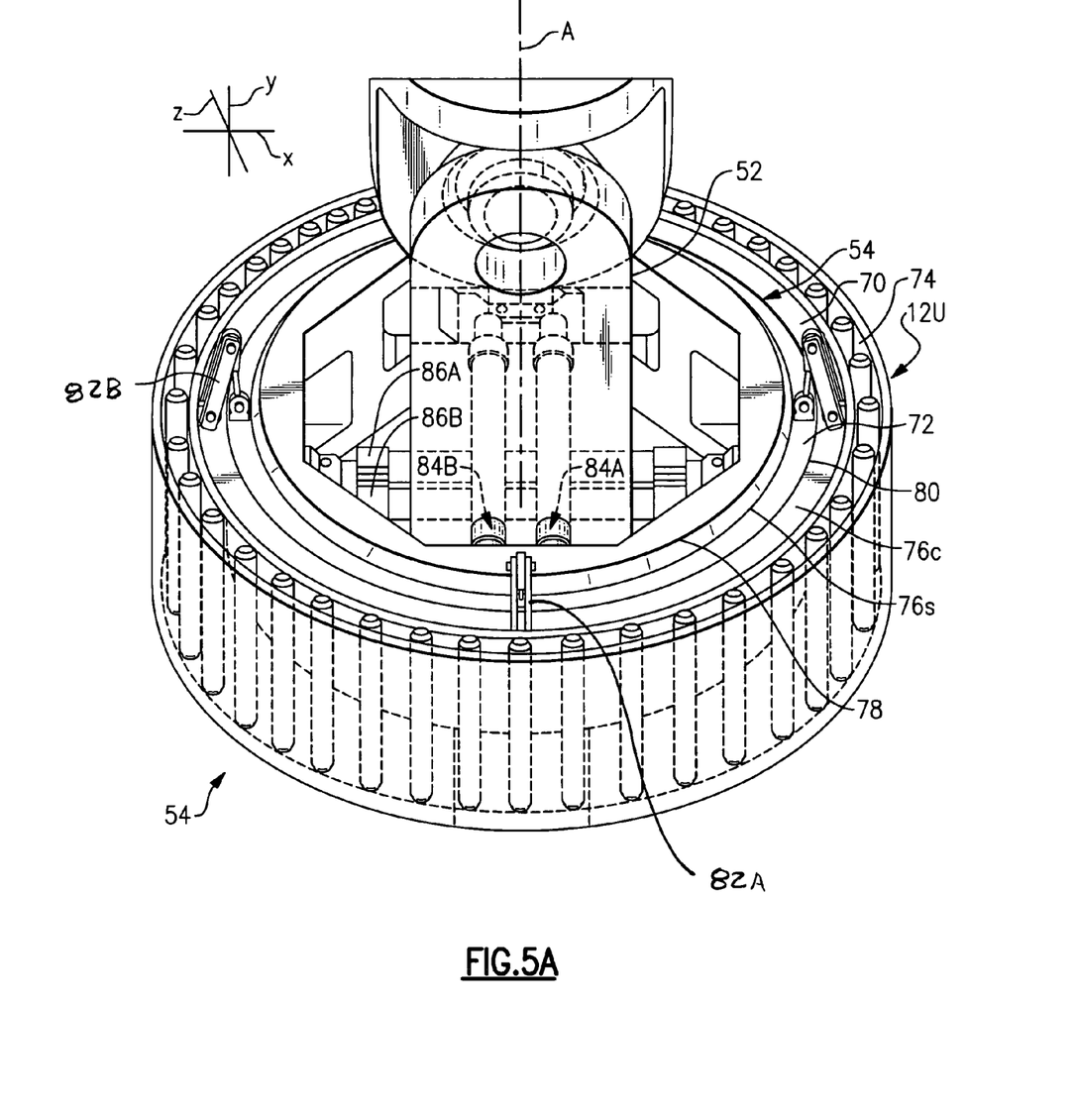
FIG. 5A is a perspective partial phantom view of an X-Y positioner assembly of the upper rotor control system.

Referring to FIG. 5A, the X-Y positioner 54 assembly enables the control rod 52 to be tilted in an X-Y direction about the spherical bearing 64 where Z is defined along the axis of rotation A while accommodating axial movement (collective). The X-Y positioner assembly 54 generally includes a support sleeve 70 mounted within the rotor shaft 12U upon a bearing assembly 74 which is preferably a needle bearing arrangement. The support sleeve 70 supports an outer race 72 for axial movement relative thereto. The outer race 72 includes a cylindrical outer diameter 76C and a spherical inner diameter 76S within which a spherical inner member 78 of the uniball is mounted.

Preferably, a low friction interface 80 such as a Teflon interface surface or the like between the cylindrical outer diameter 76C and the support sleeve 70 facilitates movement therebetween such that the axial movement (collective) of the control rod 52 is accommodated thereby. Preferably, scissor arrangements 82A, 82B (illustrated schematically) are arranged between the spherical inner member 78 and the support sleeve 70 and the outer race 72 respectively to prevent the support sleeve 70 and outer race 72 from rotating relative the shaft 12U while accommodating relative vertical and tilt movements therebetween. It should be understood that other anti-rotation systems may alternative or additionally be provided.

The spherical inner member 78 of the uniball is movable within the outer race 72 of the uniball to accommodate control rod 52 tilt off axis A. The spherical inner member 78 of the uniball supports two sets of orthogonal actuators 84A, 84B and 86A, 86B such as hydraulic cylinders with the cylinders fixed to the control rod 52. The two sets of orthogonal actuators 84A, 84B and 86A, 86B are fixed within the control rod 52 such that operation of the orthogonal actuators 84A, 84B and 86A, 86B tilts the control rod 52 off axis A. That is, the set of orthogonal actuators 84A, 84B tilt the control rod in the X-axis while the set of orthogonal actuators 86A, 86B tilt the control rid 52 in the Y-axis. More than a single actuator is preferably provided in each set so as to provide redundant operation in each of the X and Y axes.

Figure 5B:
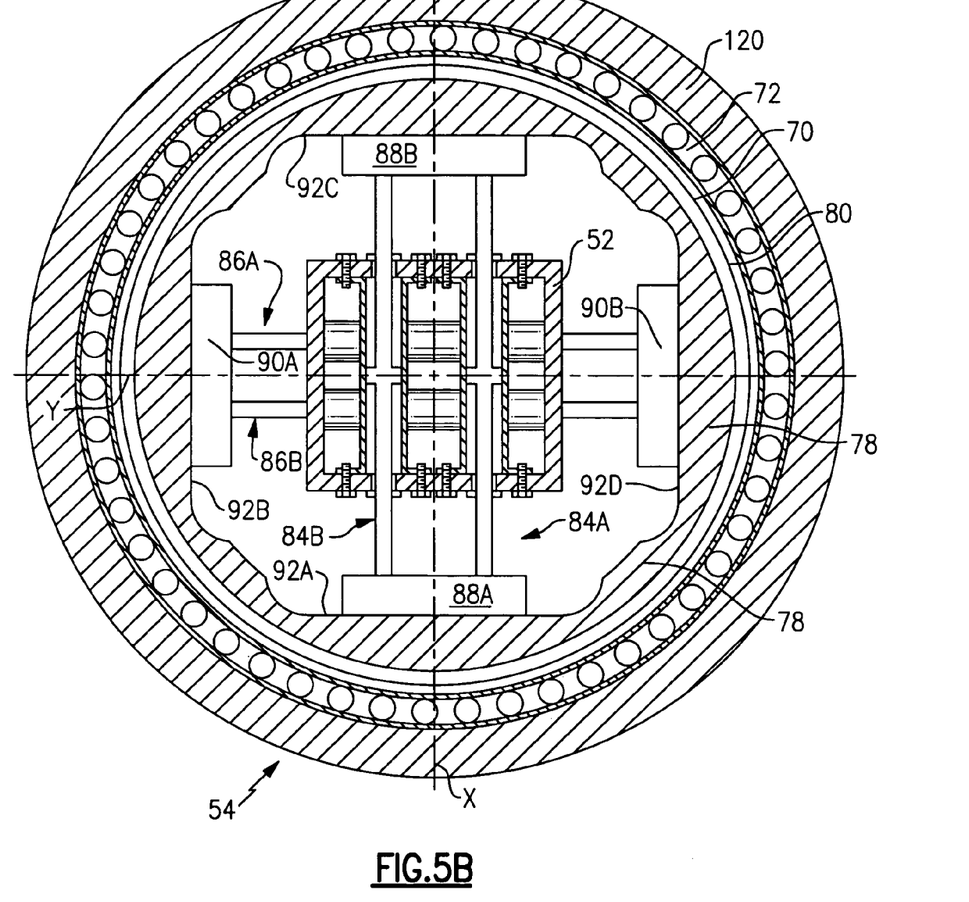
FIG. 5B is a top sectional view of the X-Y positioner assembly.

Referring to FIG. 5B, each set of orthogonal actuators 84A, 84B and 86A, 86B are attached to a set of slides 88A, 88B and 90A, 90B which are each engaged within a respective groove 92A-92D formed within the inner surface of the spherical inner member 78 of the uniball to allow one set 88A, 88B or 90A, 90B to slide within the associated grooves 92A-92D while the other set 90A, 90B or 88A, 88B are actuated. Movement of the slides 88A, 88B 90A, 90B, within grooves 92A-92D tilt the control rod 52 while the spherical inner member 78 of the uniball accommodates the pitching of the orthogonal actuators 84A, 84B and 86A, 86B that occurs when the control rod 52 tilts relative axis A.

The spherical inner member 78 of the uniball is restrained from spinning by the slides 88A, 88B and 90A, 90B of the hydraulic cylinders which are engaged in the grooves 92A-92D. It should be understood that the sets of orthogonal actuators 84A, 84B and 86A, 86B may be of various types such as mechanical, electric, magnetic electro-mechanical or otherwise.

Figure 6:
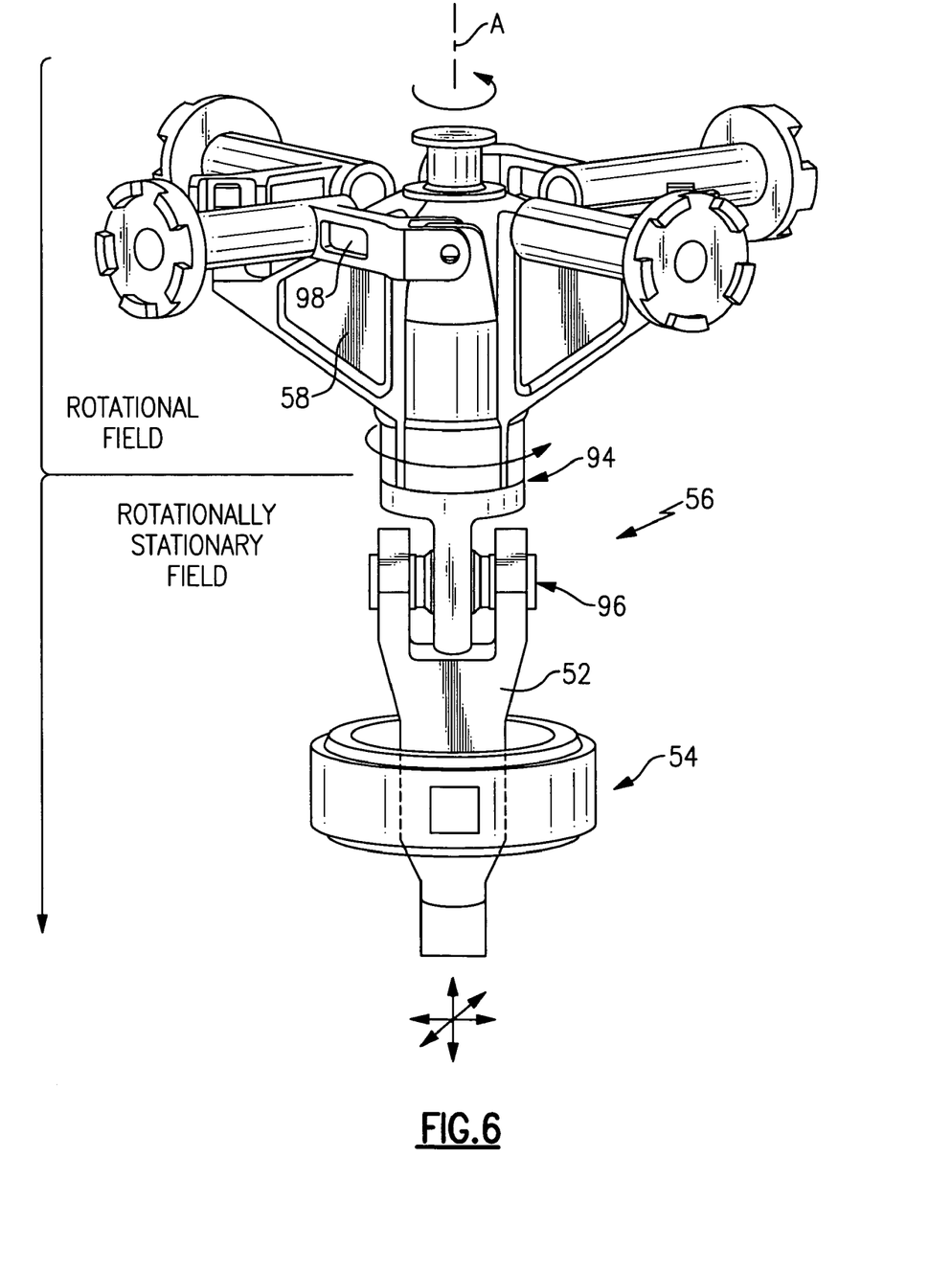
FIG. 6 is a perspective view of the upper rotor control system.

Referring to FIG. 6, the duplex bearing control rod linkage 56 preferably includes a uniball linkage 96 attachment between the control rod 52 and a rotational bearing arrangement 94 mounted to the pitch beam 58. That is, the pitch beam 58 rotates about axis A and relative the control rod 52 upon the bearing arrangement 94 while tilting movement (cyclic) between the pitch beam 58 and the control rod 52 is accommodated by the uniball linkage 96.

Figure 7:
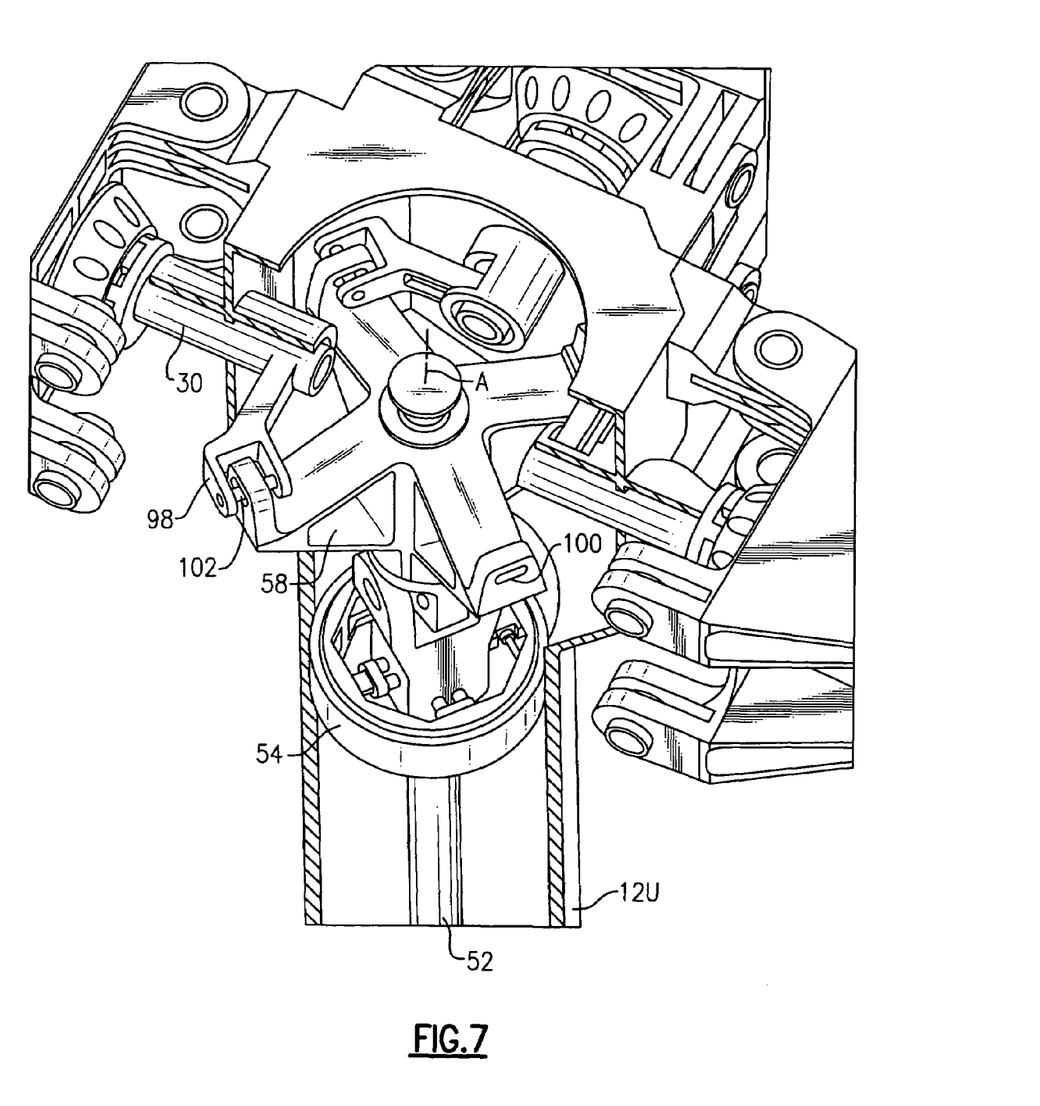
FIG. 7 is a top perspective view of a pitch beam of the upper rotor control system connected to a pitch link of the rotor blades.

Referring to FIG. 7, the pitch beam 58 is connected to each rotor blade spindle 30 through a pitch horn 98. The interface between each pitch horn 98 and the pitch beam 58 utilizes a slotted degree of freedom therebetween in which a slot 100 in the pitch beam 58 receives a pin 102 of the pitch horn 98 or vice versa. The kinematics of the pitching movement of the pitch beam 58 requires this slotted degree of freedom to provide transverse movement relative the axis A. The slotted degree of freedom is preferably further facilitated with a resilient interface having spherical and flat pad elastomerics, fabric lined bearings or the like.

Figure 8A:
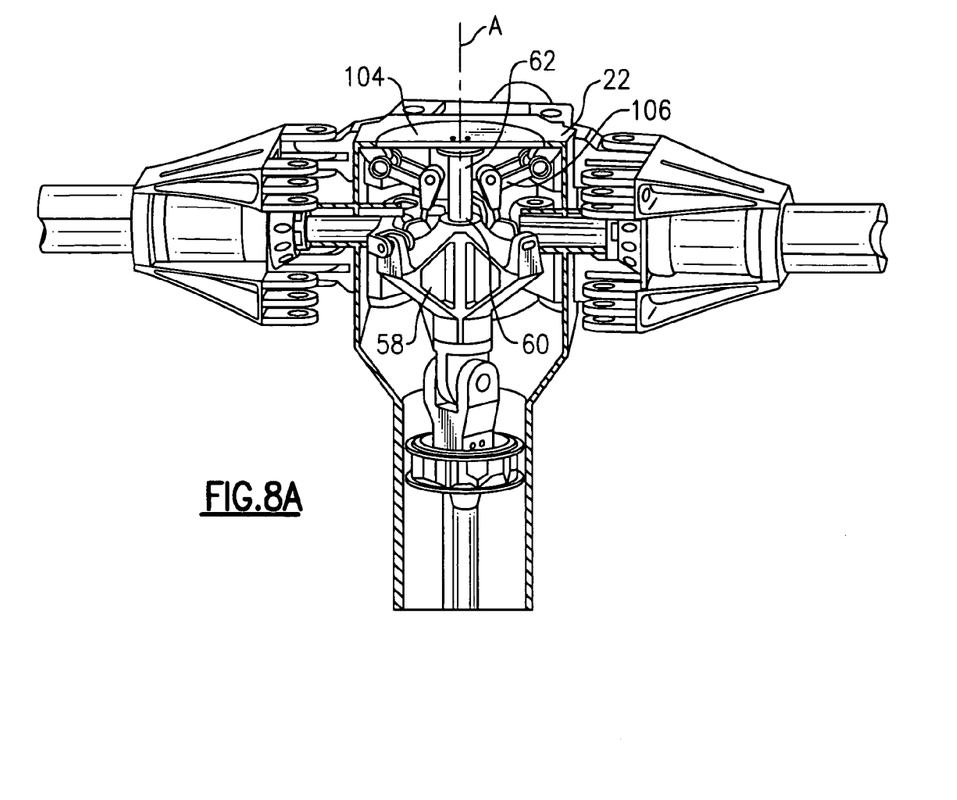
FIG. 8A is a side partial fragmentary view of the pitch beam of the upper rotor control system.
Figure 8B:
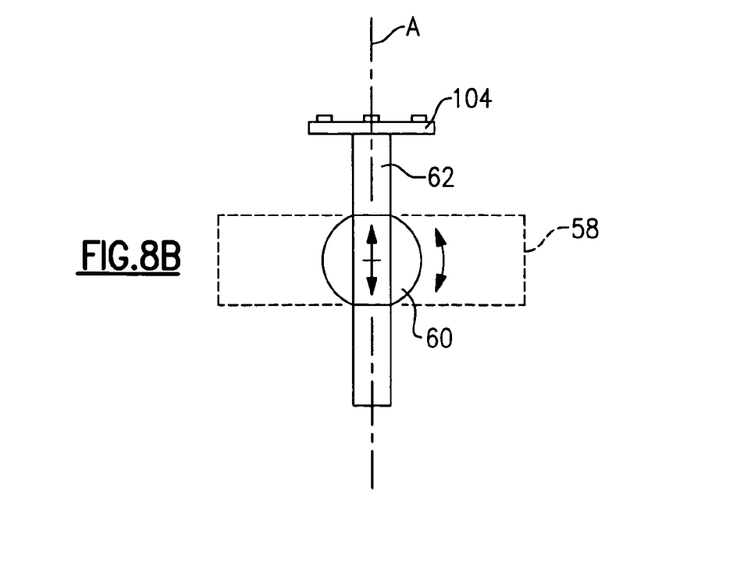
FIG. 8B is a schematic view of the pitch beam uniball and pitch beam hub support for the pitch beam of the upper rotor control system.
Figure 8C:
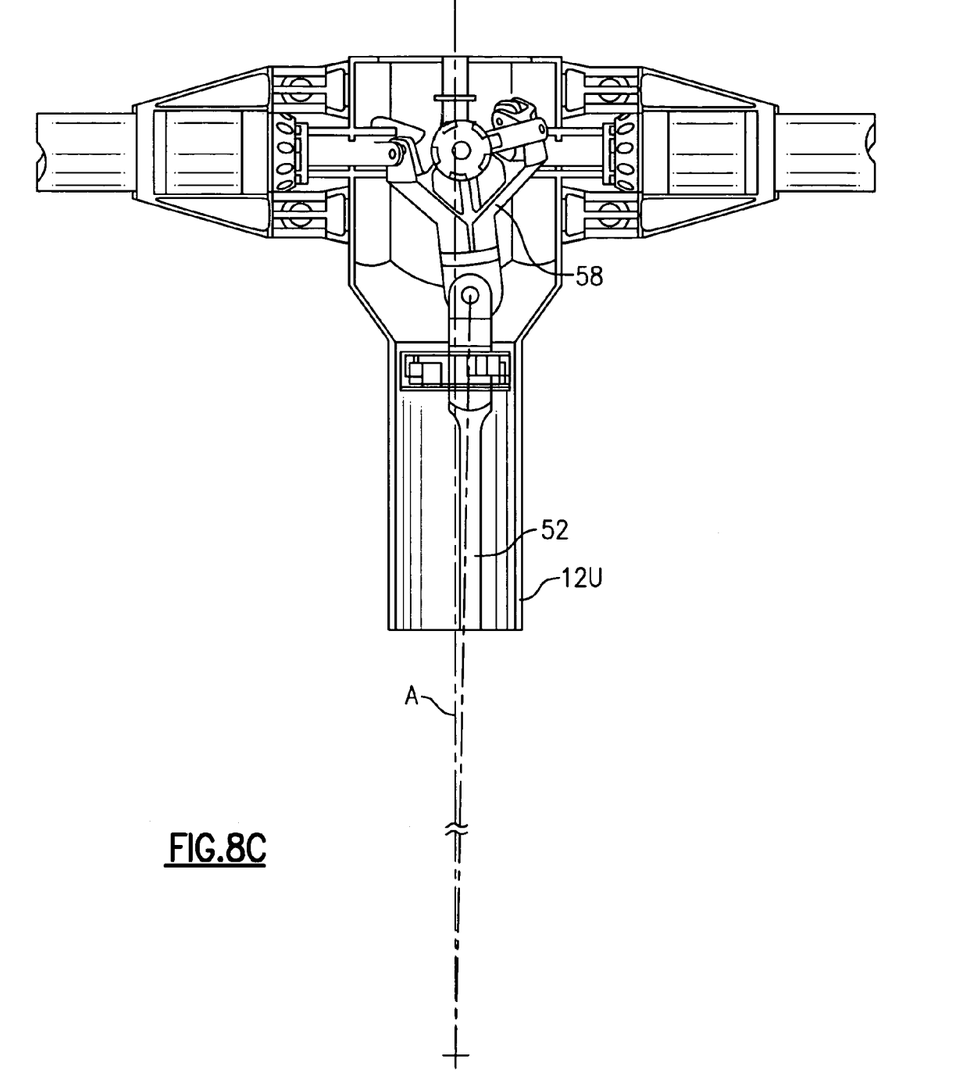
FIG. 8C is a side partial fragmentary view of the pitch beam of the upper rotor control system in a pitched position.

Referring to FIG. 8A, the pitch beam 58 is mounted within the hub assembly 22 through the pitch beam uniball 60 mounted upon the pitch beam hub support 62. The pitch beam hub support 62 projects from an upper hub surface 104 of the hub assembly such that the pitch beam uniball 60 slides along the pitch beam hub support 62 during axial movement (collective) of the pitch beam 58 and tilts about the pitch beam uniball 60 during cyclic movement of the pitch beam 58 (FIG. 8B). A pitch beam scissor assembly 106 (illustrated somewhat schematically) attaches between the pitch beam 58 and the rotor hub assembly 22 to accommodate vertical (collective) and tilting (cyclic) motions of the pitch beam 58 relative the hub support 62 (FIG. 8C).

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor control system comprising:
a control rod which is rotationally fixed;
a collective servo assembly mounted to said control rod to axially displace said control rod along a rotor shaft axis of rotation;
an X-Y positioner assembly displaced from said collective servo assembly, said X-Y positioner assembly mounted about said control rod to tilt said control rod relative said rotor shaft axis of rotation;
a pitch beam mounted to said control rod for rotation relative to said control rod;
a duplex bearing control rod linkage between said control rod and said pitch beam to accommodate said tilt of said pitch beam relative said control rod; and
a rotational bearing between said control rod and said pitch beam to accommodate said rotation between said control rod and said pitch beam.

2. The system as recited in claim 1, further comprising a pitch beam uniball which supports said pitch beam, said pitch beam uniball supported upon a pitch beam support mounted to a rotor hub assembly.

3. The system as recited in claim 1, wherein said rotor shaft axis of rotation is defined by an upper rotor shaft of a dual, counter-rotating, coaxial rotor system, said control rod mounted within said upper rotor shaft which defines said rotor shaft axis of rotation.

4. The system as recited in claim 1, wherein said X-Y positioner assembly is mounted along a length of said control rod.

5. The system as recited in claim 1, wherein said duplex bearing control rod linkage includes a uniball linkage between said control rod and a rotational bearing arrangement mounted to said pitch beam.

6. The system as recited in claim 5, wherein said pitch beam is mounted for rotation relative to said control rod upon said rotational bearing arrangement and said pitch beam is mounted for tilting movement relative said control rod through said uniball linkage.

7. A rotor control system comprising:
a control rod;
a collective servo assembly mounted to said control rod to axially displace said control rod along a rotor shaft axis of rotation;
an X-Y positioner assembly displaced from said collective servo assembly, said X-Y positioner assembly mounted about said control rod to tilt said control rod relative said rotor shaft axis of rotation; and
a pitch beam mounted to said control rod for rotation relative to said control rod which is rotationally fixed, said pitch beam mounted to a multitude of pitch horns, an interface between each of said multiple of pitch horns and said pitch beam including a slotted degree of freedom therebetween.

8. The system as recited in claim 7, wherein each pitch horn rotates a rotor blade spindle to pitch a rotor blade about a rotor blade pitch axis.

9. A rotor control system comprising:
a control rod;

a collective servo assembly mounted to said control rod to axially displace said control rod along a rotor shaft axis of rotation, said collective servo assembly mounted to a fixed structure through a spherical bearing about which said control rod tilts; and an X-Y positioner assembly displaced from said collective servo assembly, said X-Y positioner assembly mounted about said control rod to tilt said control rod relative said rotor shaft axis of rotation.

10. A rotor control system comprising:

a control rod;

a collective servo assembly mounted to said control rod to axially displace said control rod alone a rotor shaft axis of rotation;

an X-Y positioner assembly displaced from said collective servo assembly, said X-Y positioner assembly mounted about said control rod to tilt said control rod relative said rotor shaft axis of rotation, said X-Y positioner assembly comprises:

a bearing assembly;

a support sleeve mounted within said bearing assembly;

an outer race mounted within said support sleeve, said outer race axially movable along said rotor shaft axis of rotation relative said support sleeve; and a spherical inner race mounted within said outer race, said control rod mounted through said spherical inner race.

11. The system as recited in claim 10, wherein said spherical inner race supports an actuator in an X-direction and an actuator in a Y-direction to tilt said control rod relative said rotor shaft axis of rotation.

12. The system as recited in claim 10, wherein said spherical inner race supports a first actuator and a second actuator transverse to said first actuator to tilt said control rod relative said rotor shaft axis of rotation.

13. The system as recited in claim 10, further comprising a first actuator in an X-direction and a second actuator in a Y-direction to tilt said control rod relative said axis of rotation, said first actuator and said second actuator mounted to said control rod to engage said spherical member through a slidable interface.

14. A cyclic control system for a rotor system comprising:

a bearing assembly defined about an axis of rotation;

a support sleeve mounted within said bearing assembly;

an outer race mounted within said support sleeve, said outer race axially movable relative said support sleeve along said axis of rotation;

a spherical inner race mounted within said outer race;

a control rod mounted through said spherical inner race;

an X-direction actuator mounted to said control rod, said X-direction actuator having a first X-slide and a second X-slide respectively slidably engaged with said spherical inner race; and a Y-direction actuator mounted to said control rod transverse to said X-direction actuator, said Y-direction actuator having a first Y-slide and a second Y-slide respectively slidably engaged with said spherical inner race, said X-direction actuator operable to tilt said control rod relative said axis of rotation such that said first Y-slide, said second Y-slide slides relative said spherical inner race and said Y-direction actuator operable to tilt said control rod relative said axis of rotation such that said first X-slide and said second X-slide slides relative said spherical inner race.

15. The system as recited in claim 14, wherein said Y-direction actuator includes a set of actuators each engaged with said first Y-slide and said second Y-slide and said X-direction actuator includes a set of actuators each engaged with said first X-slide and said second X-slide.

16. The system as recited in claim 14, wherein each of said first Y-slide, said second Y-slide, said first X-slide and said second X-slide is engaged with a groove formed within said spherical inner race.

17. The system as recited in claim 14, wherein each of said first Y-slide, said second Y-slide, said first X-slide and said second X-slide are axially located between an upper rotor system and a lower rotor system.

* * * * *

UNITED STATES PATENT AND TRADEMARK OFFICE
CERTIFICATE OF CORRECTION

PATENT NO. : 7,585,153 B1
APPLICATION NO. : 11/502668
DATED : September 8, 2009
INVENTOR(S) : Schmaling et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Fourteenth Day of September, 2010

David J. Kappos
*Director of the United States Patent and Trademark Office*